United States Patent Office 3,131,242
Patented Apr. 28, 1964

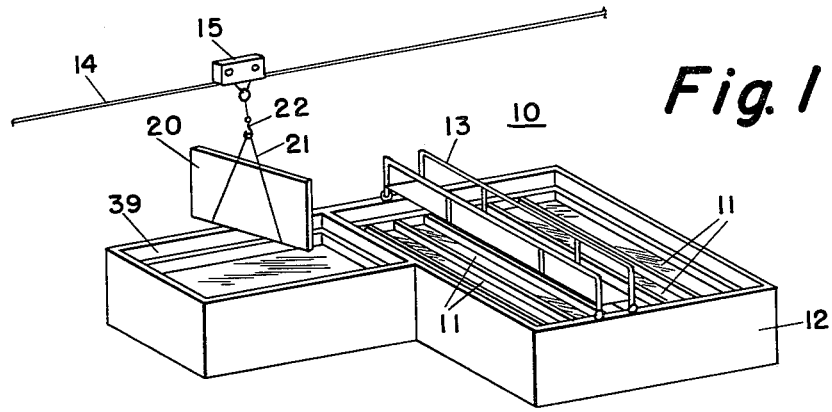
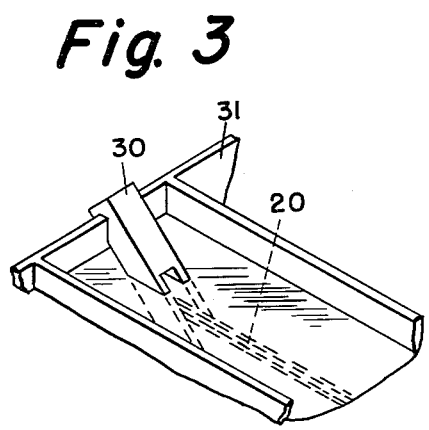
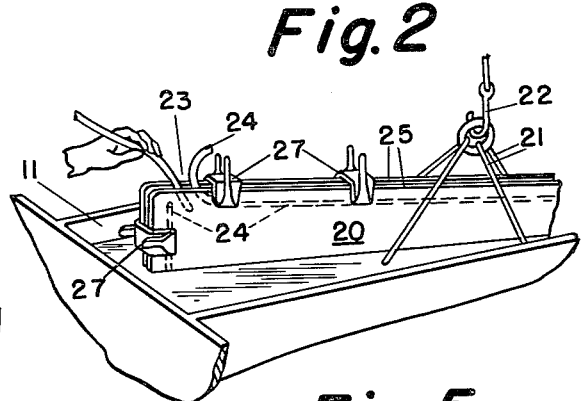
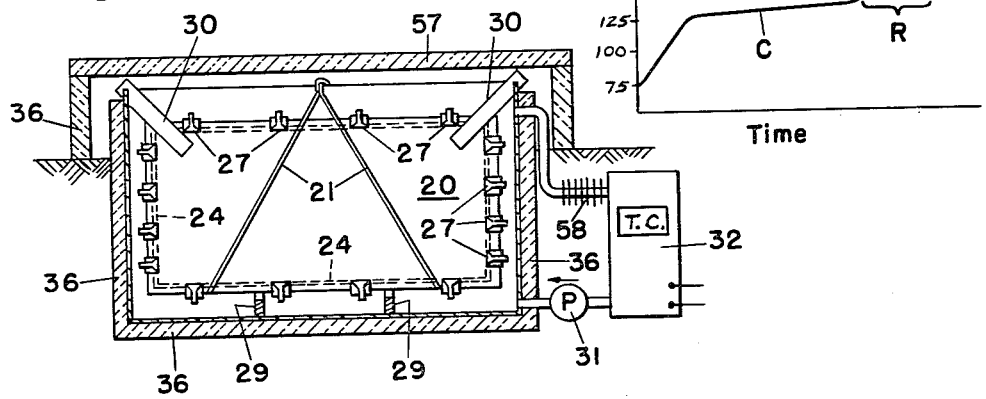

3,131,242
METHODS FOR MAKING ACRYLIC SHEETS
Jan E. Petri, Pomfret, Conn., assignor to The Borne-Lite Corporation, Landover, Md., a corporation of Maryland
Filed Sept. 21, 1961, Ser. No. 139,795
7 Claims. (Cl. 264—331)

This invention relates to methods for making cast acrylic sheets in cells formed by two sheets of glass spaced by a gasket outlining the periphery of the sheet to be cast.

In accordance with the present invention, the empty cell is vertically disposed in a bath liquid in slightly tilted position to leave an upper unsealed corner above the liquid. With the cell so disposed, it can be rapidly filled with a charge of acrylic syrup without entrapment of air and without bowing of the cell walls. After filling, the sealing of the cell is completed and it is further lowered for total immersion in the bath liquid whose temperature is maintained somewhat above the reaction temperature of the charge. After completion of the reaction, the cell is subjected, preferably in a second bath liquid, to a substantially higher temperature for post-curing of the now hard acrylic sheet within it. The two-bath method is preferred because permitting continuous processing of sheets having the same or different area and thickness and with different cells concurrently at different stages of curing.

For a more detailed understanding of the invention, reference is made to the following description of a preferred system and to the attached drawings in which:

FIG. 1, in perspective, shows equipment used at a curing station wtih a cell in transport to or from a curing tank;

FIG. 2 is a fragmentary sectional view, on enlarged scale, showing the immersed cell in position for filling;

FIG. 3 is a fragmentary perspective view showing an arrangement for maintaining the wholly immersed cell in vertical position in a curing tank;

FIG. 4 is an elevational view, in section, of a curing tank and also schematically shows associated heating and circulating equipment; and FIG. 5 is a time-temperature curve referred to in discussion of the operation of the curing apparatus shown in FIGS. 1 and 4.

Referring to FIG. 1, the curing station 10 comprises a plurality of deep narrow tanks 11 disposed side-by-side within an enclosure 12 which projects about waist-high above the floor through which the tanks extend. The movable catwalk 13 supported by rails extending along the upper edges of opposite sides of enclosure 12 facilitate safe handling of the cells or molds by an operator. The overhead track 14 of a chain-hoist 15 extends above the enclosure 12.

To load an empty cell 20 into one of curing tanks 11, the hoist 15 is moved to a loading position beyond enclosure 12. A sling or bridle 21 is looped around the cell and attached to the hoist hook 22 or equivalent. The cell is then lifted to clear enclosure 12 and the hoist is moved to position above any one of tanks 11 which is not then fully loaded. An operator on the catwalk 13 lowers and guides the cell until it is nearly completely immersed in the bath liquid; specifically water, of the selected tank.

As transported to the selected curing tank, the empty cell 20 is completely sealed except at one upper corner where a length of sealing strip 24 (FIG. 2) is temporarily left unapplied. Before completion of immersion of the cell in tank 11, it is tilted slightly, to about 10° more or less, so that the unsealed, unimmersed corner of the cell is uppermost with the cell suspended in vertical position.

As indicated in FIG. 2, the cell is then filled through the corner gap 23 of the sealing gasket 24 with a measured charge of previously prepared acrylic syrup. Such syrup may be a mixture prepared from methyl methacrylate monomer and a catalyst such as benzoyl peroxide. With the cell in such tilted vertical position, there is no entrapment of air during filling and the filling may be effected rapidly without danger of impairment of the quality of the finished sheet by surface pockets or internal blow-holes. By way of example, a cell for making 48" x 96" x .250" acrylic sheets is filled in three or four minutes.

At this point it may be noted that the cell 20 is formed from two sheets 25 of thick plate glass whose exposed faces are spaced by a strip 24 of gasket material which defines the outline and thickness of the finished acrylic sheets. The plates 25 are rigidly held in position and forced against the gasket strip by spring clamps 27, or equivalent, embracing and spaced about the peripheral edge of the cell. In the empty cell, the gasket strip 24 extends from an upper corner of the cell and thence marginally of the cell nearly back to the starting point where a short length is unapplied to leave the filling gap 23. The weight of the charge tends to increase the spacing between the plates, such tendency being the greater toward the bottom of the cell. However, such tendency is overcome by the pressure exerted by the bath liquid on the cell plates, such pressure also increasing with increasing distance from the top of the bath so that the spacing between the plates is uniform throughout the cell area within very close tolerance. The edge-clamping means of the cell permits this balancing of internal and external pressures and insures that a pre-measured charge will completely fill the cell and that the finished sheet for a given gasket strip will be of predetermined uniform thickness. After filling of the cell is completed, the corner gap 23 is closed by forcing the free end of the sealing strip 24 between the plates 25, using a putty knife or other blunt-edged tool for this purpose.

After the filled cell is sealed, it is further lowered into tank 11 until its bottom edge rests upon the spacer frame members 29 (FIG. 4). The now fully immersed cell is held in vertical position by bifurcated clamps 30 (FIGS. 3 and 4) which are positioned by the operator respectively frictionally to grip the opposite upper corners of the cell with the upper outer ends of clamps 30 hooking over the upper edge of the tank. These corner clamps 30 are preferably of wood or other poor conductor of heat. The sling 21 is then decoupled from the hoist chain, leaving the hoist 15 free for loading or unloading of other cells. The sling 21 remains looped about the immersed cell to facilitate its removal from the tank upon completion of the curing period and without hindrance by other cells that may be in the tank.

The temperature of the bath liquid in the tank 11 is maintained substantially constant at a temperature above the reaction temperature of the particular arcylic syrup mixture used but substantially below the boiling point of such mixture. For the preferred syrup mixture used, the bath temperature is maintained substantially constant at about 140° F. To that end, the water or other bath liquid is circulated through the tank by pump 31 in a path including a suitable heater 32 provided with a thermostat which may be set for the desired bath-water temperature.

To conserve heat and to minimize temperature gradients within the tank 11, its walls are substantially covered by heat insulation 36 and the top of the tank is covered by a heat-insulated lid 57 except during loading, unloading or inspection.

As the whole outer area of the cell is everywhere in direct contact with the circulating bath liquid, the temperature of the cell uniformly rises to that of the bath. Because of the enhanced heat transfer from the liquid to the cell, the exothermic reaction of the syrup begins in a small fraction of the time previously required with the air-oven method of curing heretofore commercially used; specifically, for ¼" sheets 48" x 96", the reaction begins in about six hours and is completed within about thirty minutes thereafter. Also because of the much higher heat-conductivity of the liquid bath, the temperature rise of the cell during the exothermic reaction of its charge is held in check as indicated by the portion R of the time-temperature curve C (FIG. 5). Such moderate rise is to be contrasted with that indicated by the dotted line portion E of curve C which is exemplary of the rapid rise of the cell temperature to or beyond the boiling point of the cell charge during oven curing.

The hard sheet formed by the reaction is substantially less in volume than the charge from which it is formed. The cell plates throughout their charge-engaging area are kept in intimate contact with the charge and with uniform spacing between the plates throughout such area by the pressure of the bath liquid. It is thus provided that the thickness of the finished sheet even though of large area, such as 6' x 8', is uniform throughout within close tolerance.

With the liquid bath method, when an exothermic reaction starts in any of the one or more cells in the tank, the large mass of water in good heat-conductive relation with the whole area of the cell is at once effective to abstract the exothermic heat and so check the rate of the temperature rise. As soon as there is any appreciable rise in temperature of the bath liquid because of such reaction, the thermostat of the heater 32 is effective to cut back the heat supplied to the liquid. With the heat input cut off, the heat losses from the finned water-return line 58 prevent the bath temperature, during reaction, from rising much above the initial reaction temperature, i.e., about 140°. Thus, the cell temperature is continuously under control and is not permitted to rise much above the initial reaction temperature. It is also to be noted that the cell is not subjected to the thermal shock that occurs in the oven method when a blast of cold air is introduced in an effort to check the rapid rise due to the exothermic reaction.

After completion of the reaction, as may be checked by visual inspection of the cell in tank 11, the cell may be left in that tank for the post-curing operation. If only a single cell is in a tank 11 or if all cells are introduced in a tank 11 within a short period, the time required for final curing can be reduced by re-setting the thermostat of heater 32 to maintain the bath liquid at a substantially higher temperature, for example about 200° F. The reaction having been completed with the sheet now in solid state, it is not of consequence that such higher temperature may exceed the boiling point of the initial charge.

However, for continuous production of sheets of the same or different sizes, the cell is removed from tank 11 after completion of the exothermic reaction and is dunked in a post-cure tank 39 whose liquid is maintained at the higher final-cure temperature. The post-cure tank 39 has its own heater pump and temperature control. For this preferred two-tank method, the temperature of liquid in each of tanks 11 is always substantially below the boiling temperature of the syrup but suitably above its reaction temperature: also with the two-tank method, the same pump and heater may be used for all tanks 11 rather than individual pumps and heaters.

For transfer of the cell with a cured charge from a tank 11 to the common post-cure tank 39, the hoist 15 is moved to position above tank 11 and an operator on the catwalk couples the hoist chain to the sling 21 of the immersed cell. The cell is then hoisted to clear the enclosure 12 and to move with the hoist over the post-cure tank 39 into which it is lowered and left for a suitable interval, for example, about 45 minutes. At the end of that time, the cell with its acrylic sheet now fully cured and hard is hoisted out of tank 39 for disassembly of the cell, removal of the finished sheet and reassembly of the cell.

What is claimed is:

1. A method of making cast acrylic sheets in a cell formed of two plates spaced by a sealing gasket defining the dimensions of the sheet to be made which comprises substantially completely immersing the empty cell in a liquid bath with the cell in substantially vertical position and tilted to expose above the liquid an unsealed corner of the cell, pouring a measured charge of acrylic syrup into the cell through said unsealed corner of the tilted vertically disposed cell in avoidance of entrapment of air, thereafter sealing said corner of the filled cell, completing immersion of the filled cell to provide heat-exchange contact of the bath liquid with the entire charge-engaging portions of the cell plates, and maintaining the bath liquid at substantially constant elevated temperature substantially below the boiling temperature of the syrup and above the reaction temperature of said syrup to bring the charge to reaction temperature uniformly throughout the cell and to preclude boiling of the charge during the period of its exothermic reaction in avoidance of imperfections in the finished acrylic sheet and of possible explosion of the cell during said period.

2. A method of making cast acrylic sheets in cells each formed of two plates spaced by a sealing gasket defining the dimensions of the sheet to be formed therein which comprises performing upon each cell in turn the successive steps of substantially completely immersing the empty cell in a bath liquid with the cell in substantially vertical position and tilted to expose above the liquid an unsealed corner of the cell, pouring a measured charge of acrylic syrup into the cell through its unsealed corner, sealing said corner of the cell, and completing immersion of the cell in the bath liquid; supporting the fully immersed, filled cells vertically in side-by-side relation with spacing between them to provide heat-exchange contact of the bath liquid with the charge-engaging portions of all cells, and maintaining the bath liquid at substantially constant elevated temperature above the reaction temperature of said syrup but below the boiling point thereof to effect transfer of heat from said liquid to any cell whose temperature is below the reaction temperature of its charge and to extract heat by said liquid from any immersed cell whose charge is undergoing an exothermic reaction which solidifies its charge into sheet form.

3. A method of making cast acrylic sheets in cells each formed of two plates spaced by a sealing gasket for confining a charge of acrylic syrup and defining the dimensions of the sheet formed therefrom which comprises maintaining a liquid bath at substantially constant elevated temperature above the reaction temperature of said syrup but substantially below the boiling point thereof; performing upon each cell in turn the successive steps of substantially completely immersing each empty cell in said bath with the cell in vertical position and tilted so that its uppermost and unsealed corner is above said liquid, pouring a measured charge of said syrup into the cell through its said unsealed corner, and lowering the sealed, filled cell completely to immerse it in said liquid; supporting the fully-immersed filled cells vertically in side-by-side relation with spacing between them to provide heat-exchange contact of the bath liquid with the charge-engaging portions of all cells, and removing the cells individually from said liquid bath each upon completion of the exothermic reaction which solidifies its charge into sheet form.

4. A method of making cast acrylic sheets in cells each formed of two plates spaced by a sealing gasket for confining a charge of acrylic syrup and defining the dimensions of the sheet formed therefrom which comprises maintaining a liquid bath at substantially constant elevated temperature above the reaction temperature of said syrup but substantially below the boiling point thereof; performing upon each cell in turn the successive steps of substantially completely immersing each empty cell in said bath with the cell in vertical position and tilted so that its uppermost and unsealed corner is above said liquid, pouring a measured charge of said syrup into the cell through its said unsealed corner, and lowering the sealed, filled cell completely to immerse it in said liquid; supporting the fully-immersed filled cells vertically in side-by-side relation with spacing between them to provide heat-exchange contact of the bath liquid with the charge-engaging portions of all cells, removing the cells individually from said liquid bath each upon completion of the exothermic reaction which solidifies its charge into sheet form, and immersing each cell upon its removal from said liquid bath in another liquid bath maintained at a substantially higher constant temperature for accelerated post-curing of its solidified charge.

5. A method of making cast acrylic sheets which comprises assembling a cell from two plates and edge clamps which press the plates against a sealing spacer applied to bound a marginal area of the cell except at one corner, substantially completely immersing the assembled cell in a liquid bath with the cell in vertical position and tilted to leave said corner above the liquid level, pouring a measured charge of acrylic syrup into the cell through said unsealed corner of the tilted vertically disposed cell in avoidance of entrapment of air, sealing said corner of the filled cell, lowering the filled sealed cell for complete immersion in said liquid bath, maintaining the bath liquid at substantially constant temperature above the reaction temperature of said syrup but substantially below the boiling point thereof in avoidance of imperfections in the finished sheet, and removing the cell from said liquid bath upon completion of said exothermic reaction which solidifies the charge into sheet form.

6. In a method of making cast acrylic sheets using a mold assembled from two plates pressed by yielding edge clamps against a sealing spacer strip which defines dimensions of the sheet to be formed between the opposed faces of said plates, the steps of substantially completely immersing the empty mold in a bath liquid with the cell in vertical position and tilted to expose above the liquid a corner of the mold left unsealed by an unapplied length of said strip, pouring a measured charge of acrylic syrup into the mold through said exposed unsealed corner in avoidance of entrapment of air and with the pressure of said liquid on said plates supplementing that of said edge clamps to insure that said measured charge fills the inter-plate space defined by the spacer strip, and thereafter with said mold still in said position within the bath liquid completing the sealing thereof by applying said length of the spacer strip to close said corner.

7. A continuous processing method of making cast acrylic sheets in cells of the same or different size and each formed of two plates spaced by a sealing gasket to confine a charge of acrylic syrup and to define the dimensions of its finished sheet comprising the steps of maintaining a first liquid bath at a substantially constant temperature above the reaction temperature of said syrup but substantially below the boiling temperature thereof, maintaining a second liquid bath at a substantially constant higher temperature which may exceed the boiling temperature of said syrup;

at any time and independently of the number, size or length of immersion of cells in said first liquid bath performing upon other cells the successive steps of substantially completely immersing in said first liquid bath an empty cell in vertical tilted position with an uppermost corner unsealed and exposed above the bath liquid, pouring a measured charge of said syrup into the cell through its unsealed corner, lowering the now sealed and filled cell for complete immersion in said first bath liquid, supporting the fully-immersed cells vertically in side-by-side spaced relation for transfer of heat between said first bath liquid and the charge-engaging area of all cells, said first bath liquid transferring heat to any cell whose temperature is below the reaction temperature of its charge and abstracting heat from any cell whose charge is undergoing an exothermic reaction, removing each cell from said first liquid bath upon completion of its exothermic reaction and independently of the length of time it or any other cell has been immersed in said first liquid bath, and transferring each cell, upon removal from said first bath liquid, for complete immersion in said second bath liquid and independently of the number, size or period of immersion of other cells in said second bath liquid.

References Cited in the file of this patent

UNITED STATES PATENTS

| | | |
|---|---|---|
| 2,369,593 | Marks et al. | Feb. 13, 1945 |
| 2,379,218 | Dial et al. | June 26, 1945 |
| 2,579,596 | Minter et al. | Dec. 25, 1951 |
| 2,668,328 | Porter | Feb. 9, 1954 |
| 2,687,555 | Anspon et al. | Aug. 31, 1954 |
| 3,038,210 | Hungerford et al. | June 12, 1962 |

OTHER REFERENCES

Beattie, J. O.: Modern Plastics, July 1956 (pages 109–117).